Figure 1:
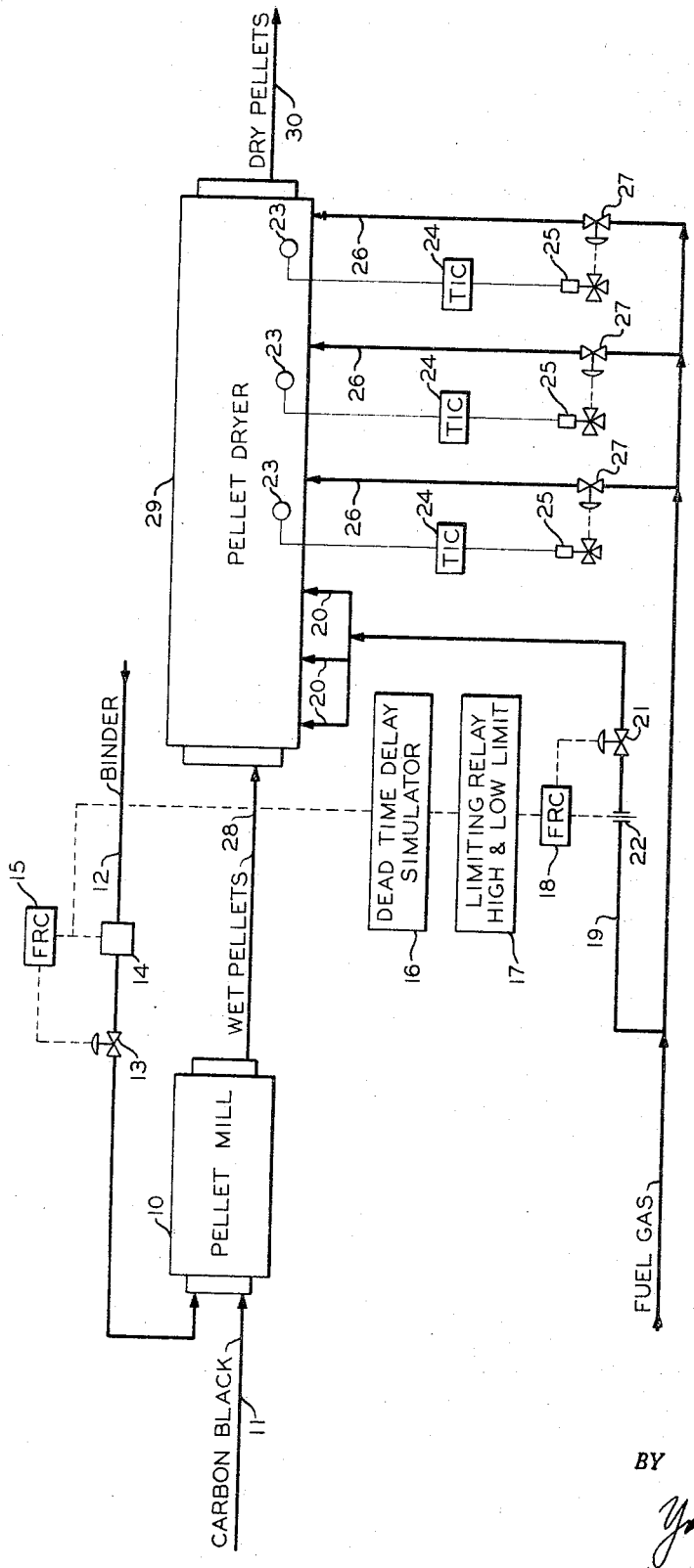

Oct. 17, 1967  R. A. FEWEL ETAL  3,346,912
METHOD AND APPARATUS TO CONTROL THE TEMPERATURE
OF A WET PELLET DRYER
Filed Jan. 2, 1962

INVENTORS.
R. A. FEWEL
J. D. HARBOUR
B. L. WHITSON

BY

*Young and Quigg*
ATTORNEYS

United States Patent Office 3,346,912
Patented Oct. 17, 1967

3,346,912
METHOD AND APPARATUS TO CONTROL THE TEMPERATURE OF A WET PELLET DRYER
Robert A. Fewel, Bartlesville, Okla., Jack D. Harbour, Borger, Tex., and Bob L. Whitson, Bartlesville, Okla., assignors to Phillips Petroleum Company, a corporation of Delaware
Filed Jan. 2, 1962, Ser. No. 163,729
9 Claims. (Cl. 18—1)

This invention relates to the control of temperatures in a wet pellet dryer. One aspect of this invention pertains to a method of controlling temperatures of a wet pellet dryer by sensing a feed stream to the pellet forming stage. Another aspect of this invention pertains to an improved apparatus for controlling temperatures in a wet pellet dryer by sensing a feed stream to the pellet forming stage.

Carbon black as initially produced is a very fine, fluffy powder of exceedingly low density which readily flies into the atmosphere and presents numerous difficulties in handling, shipping and storage, with which the industry is familiar. In order to increase its density, reduce flying and minimize handling difficulties, it is conventional to form small pellets of the carbon black which are relatively dustless, free-flowing, spheroidal pellets.

Such beads or pellets are usually produced by tumbling or otherwise agitating the carbon black with a binding agent in a slowly rotating drum. The wet pellets from the rotating pelleting drum are then passed to a dryer wherein they are dried and the moisture content is reduced to less than 1 percent and usually about 0.1 percent. Conventional dryers such as heated rotating drums are used to remove the moisture from the wet pellets. It is well known to those skilled in the art that the temperature of the dryer controls the ultimate quality of the dried pellets. If the temperature of the dryer is too hot, the dried pellets may be porous and have a spongy texture which offers little resistance to crumbling. In extreme cases the drying drum may become so hot as to ignite the carbon black. On the other hand, if the dryer is too cold, the resulting pellets may be soft, crumble easily, and cake when stored. The temperature of the pellets as they are discharged from the dryer should be in the range of about 350° to 450° F. with a range of about 375° to 425° F. being preferred. Thus, any method to more effectively control the temperature of the dryer is a valuable contribution to the art.

It has recently been discovered that the temperature of a pellet dryer can be effectively controlled by measuring the amount of a feed stream passing to the pellet forming stage and using this measurement to control the amount of heat supplied to the dryer.

Therefore it is an object of this invention to provide an improved method of controlling the temperature in a wet-pellet dryer. Another object of this invention is to provide an improved apparatus which controls the temperature in a wet-pellet dryer. Other objects and several advantages of the invention will become apparent by studying the accompanying disclosure, drawings and appended claims.

Figure 2:
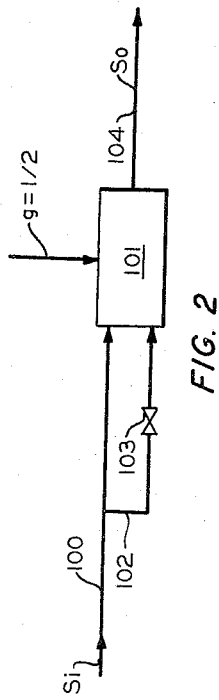

The invention may best be understood by reference to accompanying drawings. FIGURE 1 is a schematic diagram showing an arrangement of apparatus and a process in accordance with the invention. FIGURE 2 is a schematic view of a first order dead-time delay simulator.

Referring now to FIGURE 1, a group of cylindrical pellet mills 10 are positioned so as to be rotated on their horizontal axes by means not shown. Loose, flocculent carbon black is fed into the pellet mills through conduit 11. A liquid binder is fed into the pellet mills through conduit 12. The flow rate in conduit 12 can be set either manually or by means of flow control valve 13, rotameter 14 and flow rate controller 15. The flow rate of the liquid binder will vary proportionally with the flow rate of the loose flocculent carbon black so as to obtain a mixture of the carbon black and binder that readily forms pellets. A signal proportional to the flow rate through conduit 12 is passed to dead-time delay simulator 16. The dead-time delay simulator is more fully described hereinafter. The output from the dead-time delay simulator is passed to limiting relay 17 which has predetermined high and low limit set points. The limiting relay is used as a safety device to prevent overheating or underheating of the dryer in the event of a malfunction in the other instruments. The output of limiting relay 17 then manipulates the set point of flow rate controller 18 which controls the flow rate of gas through conduit 19 to pellet dryer burners 20 by means of flow control valve 21 and orifice 22. It is often desirable, though not necessary, to control the initial series of dryer burners according to the above described invention and to control the last series of dryer burners by conventional means of sensing the temperature of the pellets inside the dryer with thermocouples 23 and passing the electrical signal from thermocouples 23 to temperature controllers 24 which have a predetermined set point. The outputs of temperature controllers 24 are set to electrical solenoid valves 25 which either open or close the air supply to the diaphragm of control valves 27, thus controlling the gas flow to burners 26. The wet pellets from pellet mill 10 flow through conduit 28 to pellet dryer 29 which rotates on its horizontal axis by means not shown. The pellets are dried as they pass through the heated dryer and are withdrawn through conduit 30.

In a preferred form of the invention, the described control system is operated by air pressure. When air pressures are used it is necessary to provide supply or instrument air to the various components, but this feature is omitted here to simplify the drawing. It is also obvious to those skilled in the art that it may be desirable to use signal amplifiers and transmitters in the control system. For example, a transmitter could be placed in the control system to receive the flow signal from rotameter 14. The amplified air signal from the transmitter could then be sent to flow rate controller 15 and to dead-time delay simulator 16. Or, a transmitter could be placed in the control system to receive the differential pressure signal from orifice 22 and then send the amplified air signal to flow rate controller 18. An example of a suitable transmitter is Fischer and Porter Company Type 10A1152A–1401KA41 as shown on pp. 7 and 8 in Bulletin No. 2 of September 1958.

It is within the scope of this invention to use a device to compensate for the time elapsing between the initiation of a change in the feed stream to the pellet mills being measured and the effect of such a change on the pellets in the dryers. It is evident that a significant change in the feed to the pellet mills should not always instantaneously reset the dryer burners because the effect of the change in the feed to the pellet mill will not occur in the dryer until the contents of the pellet mill reach the dryer. The period of time required for such a change to be noticed at another point in the system is commonly called the "holdup-time" or "dead-time." Compensation for "dead-time" can be conveniently made by using a dead-time delay simulator as described in copending application Ser. No. 125,025, filed July 3, 1961, by Minor W. Oglesby, Jr., and Dale E. Lupfer, entitled, "Computing and Controlling the Enthalpy of a Process Stream." The length of dead-time delay will be dependent upon the dynamics of the particular system. It is also within the scope of this invention to operate without the dead-time delay simulator in systems where the dead-time delay is small and where other limitations such as slow heat transfer through the walls of the dryer will cause no instantaneous response inside the dryer from sudden change in the rate of flow through the feed line to the pellet mill.

A first order dead-time delay simulator, of a pneumatic type, is shown in FIGURE 2. An input signal $S_i$ is transmitted via conduit 100 to a conventional pneumatic computing relay 101, such as a Foxboro adding relay Model M56–1 shown in Bulletin 37–A–57A of the Foxboro Company. This relay is capable of solving the equation:

$$\text{Output} = -g(C) + B$$

where $g$ is the adjustable gain of the relay and $C$ and $B$ are input variables. Input signal $S_i$ is also transmitted to relay 101 via conduit 102 having a restrictor such as valve 103 therein. The output signal is transmitted via conduit 104. The transfer function for the pneumatic circuit of FIGURE 2, in terms of the output signal $S_o$ divided by the input signal $S_i$ is found by the equation:

$$\frac{S_o}{S_i} = \frac{-T_2 S - 1 + 2}{2(T_2 S + 1)} = -1/2 \left( \frac{T_2 S - 1}{T_2 S + 1} \right)$$

where $S$ is the La Place operator and $T_2$ is the time constant equal to the product of the resistance times the capacitance. The resistance can be determined by measuring the pressure drop across restrictor 103, and dividing said pressure drop by the quantity of flow through the restrictor. The capacitance is the volume of the bellows in computing relay 101.

When two or more pellet mills are operating in a parallel arrangement and feeding wet pellets into the dryer, it is often desirable to average the signals that are proportional to the feeds into the pellet mills before passing them to the dead-time delay simulator. By averaging the multiple signals a more precise control of the dryer burners can be obtained. An example of a suitable averaging relay is shown as Type 348RF1 by Taylor Instrument Company in Bulletin 98097–AC on p. 1, published in 1954.

All of the various components used in the present invention are well known in the art and, therefore, details of their construction have not been shown. For example, as shown in FIGURE 1, flow rate controller 15 can be of the type marketed by Foxboro and identified by the number M–52 in Bulletin 13–15 of November 1954. Motor valves 13, 21 and 27 can be of the type marketed by Fisher Governor Company and identified on pages 2 and 11 of Bulletin E–657A as Type 667A. Limiting relay 17 can be of the type marketed by Taylor Instrument Company and identified by number SK–11267, on p. 10, of Bulletin 98087 of October 1958. Flow rate controller 18 can be of the type marketed by Foxboro and identified by number M–52/575RG–1 in Bulletin 13–15/13–21 of November 1954. Thermocouples 23 can be iron-constantan junction type. Temperature controllers 24 can be of the type marketed by Minneapolis Honeywell and identified as Type 105C4, on p. 14, of Bulletin C10–1 published December 1958. Electric solenoid valves 25 can be of the type marketed by ASCO and identified as Type LM–83148, on p. 52, in Bulletin 8314 published in 1957. It is understood that the foregoing instruments are specific examples of types of instruments that can be used. It is obvious that other instruments performing the same function may be used in place of those named.

While the foregoing discussion has been primarily directed toward the pelleting of loose carbon black, it is understood that this invention can be utilized in the pelleting of any finely divided solid wherein the finely divided solid is combined with a binding agent and the resulting pellets dried. It is also understood that the various pieces of equipment described can be substituted by any means to accomplish the same result.

The following specific example illustrates the process and apparatus of the present invention but it is not intended to limit the invention to the specific embodiment shown therein.

*Example*

Loose flocculent carbon black is fed into each of two horizontal rotary wet mixers at a rate of between 1000 and 1250 pounds per hour. The loose carbon black is at a temperature of 250° F. The rotary wet mixers have a diameter of 20 inches and a length of 16 feet and rotate about their axes. One pound of water at 140° F. is added to the wet mixers for each pound of carbon black added. The rotating action of the mixers forms small pellets of carbon black that move to horizontal rotary polishers having a diameter of 12 inches and a length of 12 feet, where further tumbling produces smooth pellets of uniform size. The pellets, at about 180° F., then move from the rotary polishers to a horizontal rotary dryer having a diameter of 84 inches and a length of 60 feet and rotating on its horizontal axis at 2.4 revolutions per minute. The rotary dryer has gas burners positioned beneath it. As the pellets are heated inside the rotary dryer the water is evaporated and the pellets are withdrawn from the opposite end at a temperature of from 375° F. to 425° F.

The flow rate of water into the wet mixers varies with the amount of carbon black added. The water lines to the wet mixers are equipped with rotameters. Fischer and Porter Company Type 10A1152A–1401KA41 rotameter-transmitters transmit signals to a Taylor Instrument Company Type 348RF1 averaging relay. The output from the averaging relay is proportional to the amount of water flowing into the mixers at all times. This output then passes to a Taylor Instrument Company Type SK–11267 limiting relay which has predetermined high and low set points to insure that a continuous signal within certain limits will be transmitted to a Foxboro Type M–52/575RG–2 flow indicator controller. The signal from the limiting relay manipulates the set point of the flow indicator controller, thus making the set point of the flow indicator controller proportional to the measured flow of water into the wet mixers. A Foxboro Type 15A transmitter receives a pneumatic signal from a differential pressure orifice positioned in a natural gas line that leads to a gas header under the first half of the rotary dryer. Eight gas burners are connected to this gas header. The flow indicator controller receives the output of the last mentioned transmitter and then sends a pneumatic signal to a Fisher Governor Company Type 677A motor valve. Thus, the gas flow to the gas header under the first half of the rotary dryer is controlled so that it is proportional to the amount of water flowing into the wet mixers at all times. For every second of water flowing into the wet mixers, 5000 B.t.u.'s is supplied to the rotary dryer from the gas header. By using natural gas having a calorific value of 1000 B.t.u. per cubic foot, the flow indicator controller is adjusted so that 5 cubic feet of natural gas are supplied to the burners for each pound of water entering the wet mixers. The last half of the rotary dryer is heated by 12 gas burners equally spaced along the remaining length of the dryer. The burners are individually controlled by ASCO Type LM–83148 electric solenoid valves. Iron-constantan thermocouples sense the temperature of the pellets in the dryer above the individual burners and send an electrical signal to Minneapolis Honeywell Type 105C4 temperature indicator controllers that have been set at predetermined temperatures. If the temperature of the pellets is below the set point of the temperature indicator controller a signal is sent to the electric motor valve and the gas flow to at least one of the individual burners is started. If the temperature of the pellets is too high the temperature indicator controller sends a signal to the electric solenoid valve and the gas flow to some or all of the individual burners is cut off. Approximately 5 cubic feet of natural gas for each pound of carbon black is burned in the last series of individually controlled burners. The carbon black pellets leave the dryer at a temperature of between 375° and 425° F. with a moisture content of 0.1 percent.

As many possible embodiments can be made of this invention without departing from the scope thereof, it is to be understood that all matter herein set forth is to be interpreted as illustrative and not as unduly limiting the invention.

We claim:

1. Apparatus for pelleting carbon black comprising, in combination: an elongated horizontal cylindrical drum rotatable about its horizontal axis; a conduit for adding finely divided carbon black to said drum; a conduit with rate-of-flow measuring device for adding aqueous molasses solution to said drum; a conduit to pass pellets from said drum to a second elongated cylindrical drum rotatable about its horizontal axis; a dead-time delay simulator to receive a signal from said rate-of-flow measuring device which is proportional to rate-of-flow of aqueous molasses solution flowing into the first-mentioned drum; a limiting relay with predetermined high and low set points to receive a signal from said dead-time delay simulator; and a flow-rate controller receiving a signal from a rate-of-flow measuring device on a conduit for passing combustible gas to burners positioned so as to heat the second-mentioned drum, said limiting relay being adapted to regulate the set point of said flow-rate controller which actuates a flow control valve on said conduit for passing combustible gas to said burners.

2. In an apparatus for pelleting carbon black comprising, in combination: an elongated horizontal cylindrical drum rotatable about its horizontal axis; a conduit for adding finely divided carbon black to said drum; a conduit for adding aqueous molasses solution to said drum; a conduit to pass pellets from said drum to a second elongated cylindrical drum rotatable about its horizontal axis and heated so as to dry the pellets therein; and a conduit to withdraw dry pellets from said second elongated cylindrical drum; the improvement comprising a rate-of-flow measuring device on said conduit for adding aqueous molasses solution; a dead-time delay simulator to receive a signal from said rate-of-flow measuring device which is proportioinal to rate-of-flow of aqueous molasses solution flowing into the first mentioned drum; a limiting relay with predetermined high and low set points to receive a signal from said dead-time delay simulator; and a flow-rate controller receiving a signal from a rate-of-flow measuring device on a conduit for passing combustible gas positioned so as to heat the second mentioned drum, said limiting relay being adapted to regulate the set point of said flow-rate controller which actuates a flow control valve on said conduit for passing combustible gas to said burners.

3. Apparatus for pelleting finely divided solids comprising, in combination: means for adding finely divided solids to pellet-forming means; means for adding liquid binding agent to said pellet-forming means; means for measuring at least one of the amount of finely divided solids and the amount of liquid binding agent added to said pellet-forming means; pellet-drying means having a wet pellet inlet and a dry pellet outlet; means for passing wet pellets to the inlet of said pellet-drying means; means for discharging dried pellets from said outlet; means for supplying heat to said pellet-drying means adjacent its inlet in accordance with the measured amount of finely divided solids or liquid binding agent added to said pellet-forming means; temperature-measuring control means for measuring the temperature adjacent said outlet; and means for supplying sufficient heat to said pellet-drying means adjacent said outlet controlled by said temperature-measuring control means to maintain the temperature of the dried pellets adjacent said outlet at a substantially constant predetermined temperature.

4. Apparatus for pelleting finely divided solids comprising, in combination: a conduit for adding finely divided solids and a conduit for adding liquid binding agent to an elongated horizontal cylindrical drum rotatable about its horizontal axis so as to form a bed of pellets in said drum; a device for measuring the flow of finely divided solids or liquid binding agent passing to said drum; a conduit for passing pellets from said drum to the inlet end of a second elongated horizontal cylindrical drum having an inlet end and an outlet end and rotating about its horizontal axis; a flow-rate controller adapted to receive a signal proportional to the measured flow of at least one of finely divided solids and liquid binding agent into the first-mentioned cylindrical drum; a device for measuring the amount of combustible gas flowing through a conduit to burners positioned so as to heat said second elongated cylindrical drum adjacent its inlet end and passing a signal proportional to the amount of gas flowing through said conduit to burners to said flow-rate controller; a flow-control valve on said conduit to burners actuated by a signal from said flow-rate controller so as to supply a predetermined amount of gas to said burners for each measured unit of flow of finely divided solids or liquid binding agent to the first-mentioned cylindrical drum; temperature measuring control means for measuring the temperature adjacent said outlet end; and means for supplying sufficient heat to said second drum adjacent said outlet end controlled by said temperature-measuring control means to mantain the temperature of the dried pellets adjacent said outlet end at a substantially constant predetermined temperature.

5. In an apparatus for producing pellets of finely divided solids comprising, in combination: means for passing loose finely divided solids to pellet-forming means; means for passing liquid binding agent to said pellet-forming means; means for passing wet pellets from said pellet-forming means to the inlet end of a pellet-drying means having an inlet end and an outlet end; and means for recovering dry pellets from said outlet end; the improvement which comprises means for measuring at least one of the amount of finely divided solids and the amount of liquid binding agent added to said pellet-forming means; means for controlling amount of heat supplied to said pellet-drying means adjacent said inlet end in accordance with the measured amount of finely divided solids or liquid binding agent added to said pellet-forming means; temperature-measuring control means for measuring the temperature adjacent said outlet end; and means for supplying sufficient heat to said pellet-drying means adjacent said outlet end controlled by said temperature-measuring control means to maintain the temperature of the dried pellets adjacent said outlet end at a substantially constant predetermined temperature.

6. In an apparatus for producing pellets of finely divided solids which comprises, in combination: a conduit for adding finely divided solids and a conduit for adding liquid binding agent to an elongate horizontal cylindrical drum rotatable about its horizontal axis so as to form a bed of pellets in said drum; a conduit for passing wet pellets from said drum to the inlet end of a second elongated horizontal cylindrical drum having an inlet end and an outlet end and rotating about its horizontal axis and heated so as to dry said wet pellets; and a conduit to withdraw dry pellets from the outlet end of the second-mentioned cylindrical drum; the improvement comprising a device for measuring the amount of liquid binding agent added to the first-mentioned cylindrical drum; a flow-rate controller adapted to receive a signal proportional to the measured flow of liquid binding agent into the first-mentioned cylindrical drum; a device for measuring the amount of combustible gas flowing through a conduit to burners positioned adjacent said inlet end so as to heat said second elongated cylindrical drum and passing a signal proportional to the amount of gas flowing through said conduit to burners to said flow-rate controller; a flow-control valve on said conduit to burners actuated by a signal from said flow-rate controller so as to supply a predetermined amount of gas to said burners for each measured unit of flow of liquid binding agent to the first-mentioned cylindrical drum; temperature-measuring control means for measuring the temperature adjacent said outlet end; and means for supplying sufficient heat to said second drum adjacent said outlet end controlled by said temperature-measuring control means to maintain the temperature of the dried pellets adjacent said outlet end at a substantially constant predetermined temperature.

7. A continuous pelletizing system, comprising: automatic means for mixing pelletizing fluid and powdery material and for forming pellets therefrom; a dryer having an inlet end and an outlet end adapted to receive the pellets adjacent said inlet end, to dry them and to discharge them adjacent said outlet end, said dryer having a first heating element adjacent said inlet end and a fuel supply conduit for connecting said first heating element with a fuel supply, said conduit being provided with fuel flow rate sensing and regulating means; fuel/pelletizing fluid ratio control means, associated with said fuel flow sensing and regulating means and responsive to the rate at which pelletizing fluid is mixed with the powdery material, for maintaining a predetermined ratio between said rates; temperature-measuring control means for measuring the temperature adjacent said outlet end; and means for supplying sufficient heat to said dryer adjacent said outlet end controlled by said temperature-measuring control means to maintain the temperature of the dried pellets adjacent said outlet end at a substantially constant predetermined temperature.

8. Apparatus for pelleting carbon black comprising, in combination: an elongated horizontal cylindrical drum rotatable about its horizontal axis; a conduit for adding finely divided carbon black to said drum; a conduit with rate-of-flow measuring device for adding aqueous molasses solution to said drum; a conduit to pass pellets from said drum to the inlet end of a second elongated cylindrical drum having an inlet end and an outlet end and rotatable about its horizontal axis; a dead-time delay simulator to receive a signal from said rate-of-flow measuring device which is proportional to rate-of-flow of aqueous molasses solution flowing into the first-mentioned drum; a limiting relay with predetermined high and low set points to receive a signal from said dead-time delay simulator; and a flow-rate controller receiving a signal from a rate-of-flow measuring device on a conduit for passing combustible gas to burners positioned so as to heat the second-mentioned drum adjacent its inlet end, said limiting relay being adapted to regulate the set point of said flow-rate controller which actuates a flow control valve on said conduit for passing combustible gas to said burners; temperature-measuring control means for measuring the temperature adjacent said outlet end; and means for supplying sufficient heat to said second drum adjacent said outlet end controlled by said temperature-measuring control means to maintain the temperature of the dried pellets adjacent said outlet end at a substantially constant predetermined temperature.

9. In an apparatus for pelleting carbon black comprising, in combination: an elongated horizontal cylindrical drum rotatable about its horizontal axis; a conduit for adding finely divided carbon black to said drum; a conduit for adding aqueous molasses solution to said drum; a conduit to pass pellets from said drum to the inlet end of a second elongated cylindrical drum having an inlet end and an outlet end and rotatable about its horizontal axis and heated so as to dry the pellets therein; and a conduit to withdraw dry pellets from said second elongated cylindrical drum; the improvement comprising a rate-of-flow measuring device on said conduit for adding aqueous molasses solution; a dead-time delay simulator to receive a signal from said rate-of-flow measuring device which is proportional to rate-of-flow of aqueous molasses solution flowing into the first-mentioned drum; a limiting relay with predetermined high and low set points to receive a signal from said dead-time delay simulator; and a flow-rate controller receiving a signal from a rate-of-flow measuring device on a conduit for passing combustible gas positioned so as to heat the second-mentioned drum adjacent its inlet end, said limiting relay being adapted to regulate the set point of said flow-rate controller which actuates a flow control valve on said conduit for passing combustible gas to said burners; temperature-measuring control means for measuring the temperature adjacent said outlet end; and means for supplying sufficient heat to said second drum adjacent said outlet end controlled by said temperature-measuring control means to maintain the temperature of the dried pellets adjacent said outlet end at a substantially constant predetermined temperature.

References Cited

UNITED STATES PATENTS

| | | | |
|---|---|---|---|
| 2,167,674 | 8/1939 | Offut | 106—307 |
| 2,652,344 | 9/1953 | Simms | 106—307 |
| 2,803,038 | 8/1957 | Holland et al. | 18—1 |
| 2,848,347 | 8/1958 | Rushford | 106—307 |
| 2,850,403 | 9/1958 | Day | 106—307 |
| 2,867,843 | 1/1959 | Browne et al. | 18—1 |
| 3,017,662 | 1/1962 | Marsh | 18—1 |
| 3,071,803 | 1/1963 | Austin | 18—1 |
| 3,102,005 | 8/1963 | Dye | 18—1 X |

WILLIAM J. STEPHENSON, *Primary Examiner.*

JOSEPH REBOLD, ALLAN LIEBERMAN, *Examiners.*